United States Patent
Moravec et al.

(10) Patent No.: US 9,427,842 B1
(45) Date of Patent: Aug. 30, 2016

(54) SYSTEMS AND METHODS FOR CORRECTING READ/WRITE OVERLAY ERRORS IN THE MANUFACTURE OF MAGNETIC TRANSDUCERS FOR STORAGE DRIVES

(75) Inventors: Mark D. Moravec, Lamlukka (TH); Chakkrit Supavasuthi, Chatuchak (TH); Theera Yaemglin, Kukot (TH)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 411 days.

(21) Appl. No.: 13/537,018

(22) Filed: Jun. 28, 2012

(51) Int. Cl.
*B24B 37/11* (2012.01)
*B24B 37/27* (2012.01)
*B24B 37/005* (2012.01)
*G11B 5/31* (2006.01)

(52) U.S. Cl.
CPC ............ *B24B 37/27* (2013.01); *B24B 37/005* (2013.01); *G11B 5/3169* (2013.01); *G11B 5/3163* (2013.01)

(58) Field of Classification Search
CPC ................ G11B 5/3166; Y10T 29/53039
USPC .......... 29/14, 33.52, 603.07, 603.16, 603.17, 29/737, 603.15, 603.01, 603, 7, 603.09, 29/603.13
See application file for complete search history.

(56) References Cited

U.S. PATENT DOCUMENTS

| | | | | |
|---|---|---|---|---|
| 5,203,119 A | * | 4/1993 | Cole | B24B 37/013 451/11 |
| 5,607,340 A | * | 3/1997 | Lackey | B24B 37/048 29/603.16 |
| 5,620,356 A | * | 4/1997 | Lackey | B24B 37/048 29/603.09 |
| 5,899,793 A | * | 5/1999 | Yanagida | B24B 37/048 451/278 |
| 6,050,878 A | * | 4/2000 | Kanzo | B24B 37/048 451/1 |
| 6,093,083 A | * | 7/2000 | Lackey | B24B 37/048 29/603.16 |
| 6,095,895 A | * | 8/2000 | Fujita | B24B 37/048 451/5 |
| 6,217,425 B1 | * | 4/2001 | Shindou | B24B 37/00 29/603.16 |
| 6,261,165 B1 | | 7/2001 | Lackey et al. | |
| 6,315,633 B1 | * | 11/2001 | Kozu | B24B 37/048 29/603.16 |
| 6,315,636 B1 | * | 11/2001 | Yanagida | B24B 37/048 451/11 |

(Continued)

*Primary Examiner* — Peter DungBa Vo
*Assistant Examiner* — Kaying Kue
(74) *Attorney, Agent, or Firm* — Gabriel Fitch; Loza & Loza, LLP

(57) ABSTRACT

Systems and methods for correcting read/write overlay errors in the manufacture of magnetic transducers for storage drives are provided. One such system includes a twisting tool configured to receive and secure a row bar having an elongated rectangular block shape and including a plurality of magnetic transducers spaced apart along a length of the row bar, and where the twisting tool is configured to twist the row bar at a plurality of areas along the length of the row bar.

8 Claims, 5 Drawing Sheets

(56) References Cited

U.S. PATENT DOCUMENTS

| | | | |
|---|---|---|---|
| 6,375,539 B1* | 4/2002 | Sudo | B24B 37/042 451/232 |
| 6,447,367 B1* | 9/2002 | Kozu | B23Q 1/34 29/603.16 |
| 6,546,355 B2 | 4/2003 | Matsushita | |
| 6,599,170 B2* | 7/2003 | Sone | B24B 37/048 29/603.16 |
| 6,604,989 B2* | 8/2003 | Yanagida | B24B 37/048 451/232 |
| 6,662,069 B1 | 12/2003 | Khlif | |
| 6,722,947 B2 | 4/2004 | Nishioka et al. | |
| 6,758,721 B2* | 7/2004 | Shindo | B24B 37/048 451/364 |
| 6,802,761 B1 | 10/2004 | Beaucage et al. | |
| 6,831,277 B1* | 12/2004 | Nakata | G11B 5/3103 250/372 |
| 6,942,544 B2 | 9/2005 | Beaucage et al. | |
| 7,014,532 B2* | 3/2006 | Nishioka | B24B 37/005 451/10 |
| 7,049,809 B2 | 5/2006 | Luo et al. | |
| 7,147,539 B1* | 12/2006 | Hao | B24B 37/00 29/603.15 |
| 7,153,198 B2* | 12/2006 | Fujii | B24B 37/048 451/364 |
| 7,467,460 B2 | 12/2008 | Tan et al. | |
| 7,562,435 B2 | 7/2009 | Mahadev et al. | |
| 7,634,850 B2* | 12/2009 | Tanaka | G11B 5/3169 29/603.07 |
| 7,681,303 B2* | 3/2010 | Kondo | G11B 5/1278 29/603.09 |
| 2001/0004800 A1* | 6/2001 | Yoshida | G11B 5/3103 29/737 |
| 2001/0041319 A1* | 11/2001 | Ishizaki | B24B 37/30 432/239 |
| 2002/0052164 A1* | 5/2002 | Sudo | B24B 37/042 451/5 |
| 2002/0052172 A1* | 5/2002 | Nishioka | B24B 37/00 451/41 |
| 2002/0077044 A1* | 6/2002 | Shindo | B24B 37/048 451/285 |
| 2002/0126421 A1* | 9/2002 | Takahashi | B24B 37/00 360/313 |
| 2004/0209546 A1* | 10/2004 | Nishioka | B24B 37/005 451/5 |
| 2005/0028354 A1* | 2/2005 | Shindo | B24B 37/013 29/603.12 |
| 2005/0237673 A1* | 10/2005 | Mizoguchi | B24B 19/26 360/313 |
| 2006/0160473 A1* | 7/2006 | Fujii | B24B 37/048 451/41 |
| 2007/0209437 A1* | 9/2007 | Xue | B81B 3/0032 73/514.31 |
| 2008/0022510 A1* | 1/2008 | Tanaka | G11B 5/3169 29/603.16 |
| 2009/0061737 A1* | 3/2009 | Sudo | B24B 37/042 451/28 |
| 2009/0313811 A1* | 12/2009 | Takahashi | G11B 5/1278 29/603.23 |

* cited by examiner

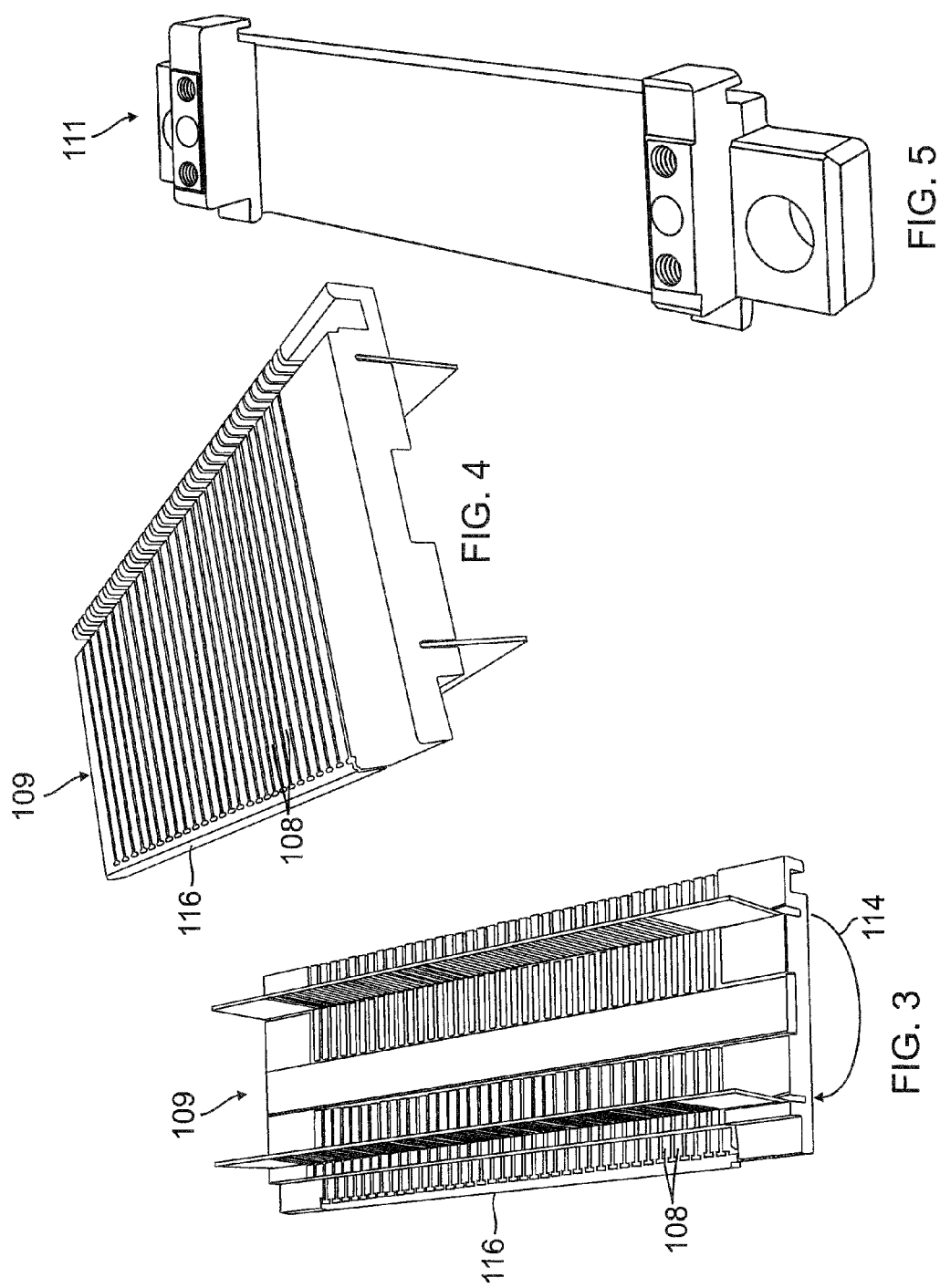

SYSTEMS AND METHODS FOR CORRECTING READ/WRITE OVERLAY ERRORS IN THE MANUFACTURE OF MAGNETIC TRANSDUCERS FOR STORAGE DRIVES

FIELD

The present invention relates generally to the manufacture of components for magnetic storage drives, and more specifically to systems and methods for correcting read/write overlay errors in the manufacture of magnetic transducers for storage drives.

BACKGROUND

Modern and future magnetic storage drive platters need precise writer and reader lapping geometry control (e.g., less than or equal to about 3 nm for one sigma) for the magnetic transducers or sliders. Current reader to writer overlay alignment at wafer level, as measured by wafer fabrication, is insufficient (e.g., greater than 5 nm for one sigma). The measurement of overlay between successive patterned layers on a wafer is one of the most important process control techniques used in the manufacturing of integrated circuits and devices such as sliders. Overlay generally pertains to the determination of how accurately a first patterned layer (e.g., reader layer) aligns with respect to a second patterned layer (e.g., writer layer) disposed above or below it. Overlay is described in greater detail in U.S. Pat. No. 7,804,994, the entire content of which is incorporated herein by reference.

The "as printed" overlay sigma, as discussed above, results in the inability to meet both the reader and writer lapping height requirements. For example, if the desired reader height is obtained, then writer height is sacrificed and vice versa. Current lapping technology utilizes three axis correction. A first axis relates to the balance used to keep the row bar height on both ends equal during lapping cycle. A second axis relates to the bending of the bar in between the sliders positioned at the ends of the bar. A third axis relates to the tilting of the row bar to increase or decrease the writer removal relative to the reader removal. Various lapping technology including the third axis tilting of the row bar for correction is described in U.S. Pat. No. 7,681,303, the entire content of which is incorporated herein by reference.

Historically lapping tools have been designed such that great effort, thought, modeling and trial and error are invested to ensure the row bar does not twist during the lapping cycle due to bending, balancing and lapping shear forces. This is because it is thought to be well known that row bar twisting will compromise the reader/writer overlay.

SUMMARY

Aspects of the invention relate to systems and methods for correcting read/write overlay errors in the manufacture of magnetic transducers for storage drives. In one embodiment, the invention relates to a system for correcting for overlay errors in row bars, the system including a twisting tool configured to receive and secure a row bar having an elongated rectangular block shape and including a plurality of magnetic transducers spaced apart along a length of the row bar, and where the twisting tool is configured to twist the row bar at a plurality of areas along the length of the row bar.

In another embodiment, the invention relates to a method for correcting for overlay errors in row bars, the method including measuring an overlay error at preselected positions along a length of the row bar, where the row bar includes an elongated rectangular block shape and a plurality of magnetic transducers spaced apart along the length of the row bar, where the overlay error is indicative of a variation from a parallel orientation of a reader layer and a writer layer of at least one of the plurality of magnetic transducers, twisting the row bar to substantially correct the overlay error, and lapping the row bar to substantially correct the overlay error.

BRIEF DESCRIPTION OF THE DRAWINGS

FIG. 3 is a top perspective view of the force translation segment assembly of FIG. 1 which includes multiple force translation segments for translating the resulting rotational force into twisting forces on the row bar in accordance with one embodiment of the invention.

FIG. 4 is a bottom perspective view of the force translation segment assembly of FIG. 1 in accordance with one embodiment of the invention.

FIG. 5 is a top perspective view of a base portion of the first twisting tool of FIG. 1 in accordance with one embodiment of the invention.

DETAILED DESCRIPTION

Figure 1:
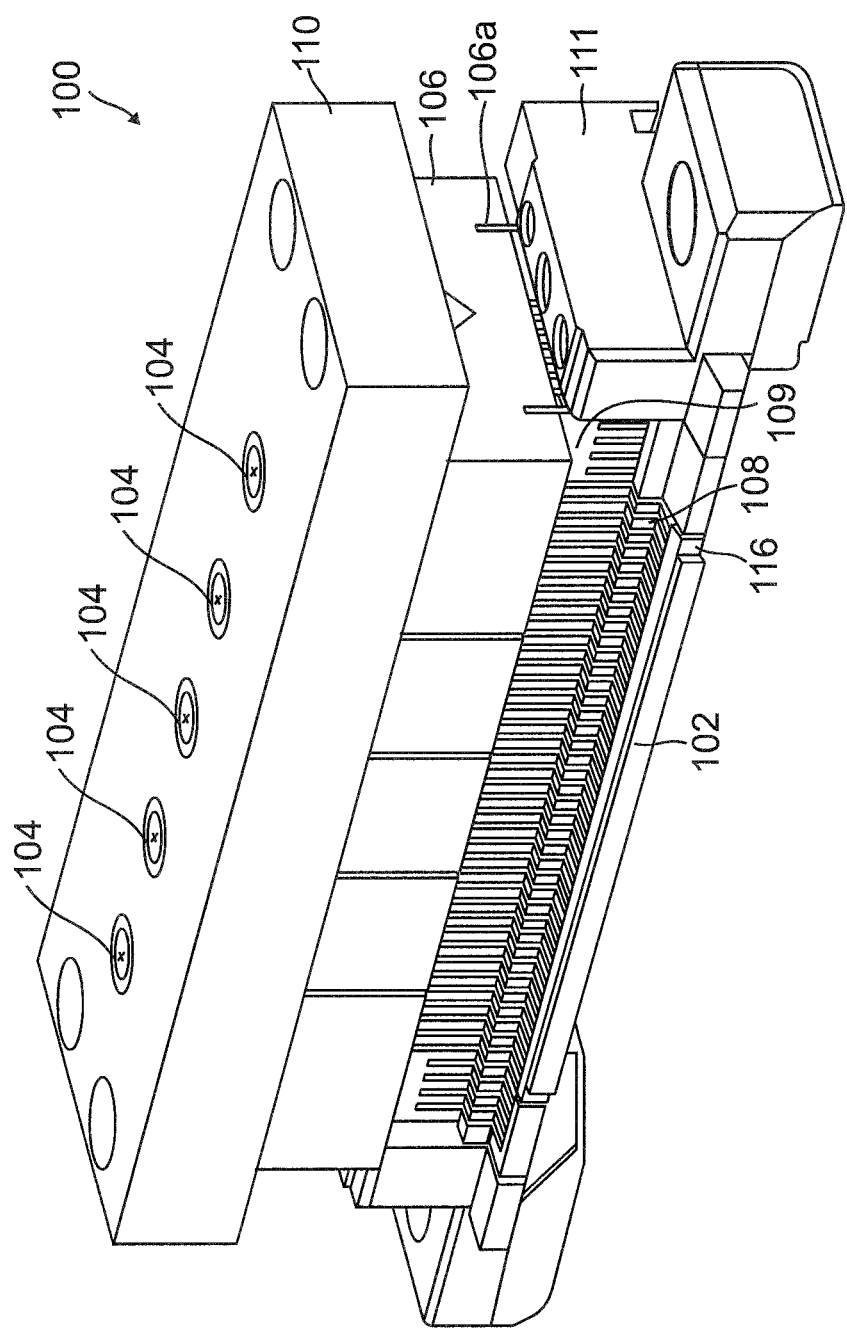
FIG. 1 is a perspective view of a first twisting tool and a row bar mounted thereto, the twisting tool having multiple set screws for applying twisting forces via block sections and a force translation segment assembly to the row bar at various points along the row bar in accordance with one embodiment of the invention.

Referring now to the drawings, embodiments of systems and methods for correcting read/write overlay errors in the manufacture of magnetic transducers using twisting tools are illustrated. The twisting tools receive and secure a row bar having an elongated rectangular block shape and a plurality of magnetic transducers spaced apart along the length of the row bar, where the twisting tools are configured to twist the row bar at various areas along the length of the row bar. In some embodiments, the twisting tools include a number of manual set screws for applying twisting forces at preselected points along the row bar. In several embodiments, the twisting tools are used in conjunction with a lapping tool and both tools are used to correct overlay error.

In some embodiments, the twisting tools include, a number of automatically controlled servo motors or voice coils for applying the twisting forces at preselected points along the row bar, and one or more electronic lap guides for providing feedback on the overlay error during a lapping process. In a number of embodiments, the twisting tools include multiple planar segments for applying the twisting forces to the row bars. The sizes and shapes of suitable planar segments can vary. Methods for correcting read/write overlay errors in the manufacture of magnetic transducers can include measuring the overlay error at preselected positions along a length of the row bar, twisting the row bar to substantially correct the overlay error, and lapping the row bar to substantially correct the overlay error.

FIG. 1 is a perspective view of a first twisting tool 100 and a row bar 102 mounted thereto, the twisting tool 100 having multiple set screws 104 for applying twisting forces via block sections 106 and force translation segments 108 (e.g., planar segments) to the row bar 102 at various points along the row bar 102 in accordance with one embodiment of the invention. The five set screws 104 are disposed within a top portion 110 of the twisting tool 100. The top portion 110 is attached to a base portion 111 by a couple of bolts (not shown). The force translation segments 108 are components of a force translation segment assembly 109 (see also FIGS. 3 and 4) that is effectively sandwiched between the block sections 106 and the base portion 111. More specifically, the force translation segment assembly 109 has a substantially U-shaped body where the ends extend into elongated slots 106a of the block sections 106. The row bar 102 includes a number of magnetic transducers spaced apart along the length of the row bar at roughly equal intervals, as is well known in the manufacture of magnetic transducers for magnetic storage drives.

Figure 2:
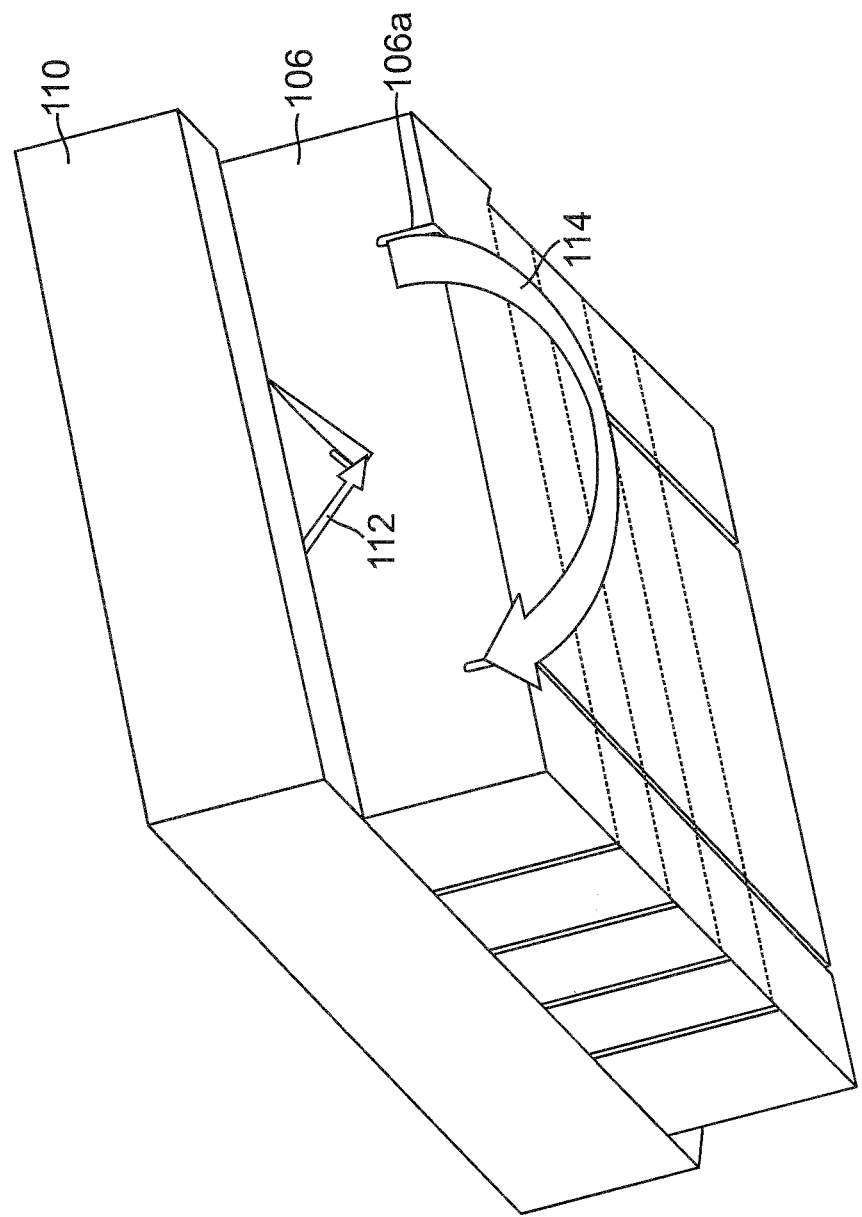
FIG. 2 is a perspective view of a finite element method (FEM) model of the top portion of the twisting tool and the block sections illustrating applied set screw forces on the block sections and resulting rotational force on the force translation segment assembly in accordance with one embodiment of the invention.

FIG. 2 is a perspective view of a finite element method (FEM) model of the top portion 110 of the twisting tool 100 and the block sections 106 illustrating applied set screw forces 112 on the block sections 106 and resulting rotational force 114 on the force translation segment assembly 109 in accordance with one embodiment of the invention.

FIG. 3 is a top perspective view of the force translation segment assembly 109 of FIG. 1 which includes the multiple force translation segments 108 (e.g., planar segments) for translating the resulting rotational force 114 into twisting forces on the row bar in accordance with one embodiment of the invention.

In operation, and referring now to FIGS. 1 to 3, one of the set screws 104 can apply the downward force 112 into the first twisting tool 100. As a result, the rear portion of the block section 106 can generate a rotational force 114 on the force translation segment assembly 109 and selected force translation segments 108 in contact with the particular block section which change an angle of a portion of the mounting face 116 of the first twisting tool 100, thereby twisting a portion of the row bar 102 in a clockwise manner. Similarly, if one of the set screws 104 is retracted, a resulting upward force from the corresponding block section 106 is created. As such, the front portion of the block section 106 can cause a force substantially opposite in direction to rotational force 114 on the force translation segment assembly 109 and selected force translation segments 108 in contact with the particular block section which change the angle of the mounting face portion 116 of the first twisting tool 100, thereby twisting a portion of the row bar 102 in a counterclockwise manner.

The row bar 102 is attached to the mounting face portion 116 of the force translation assembly 109 using adhesive tape. In several embodiments, the adhesive tape is a polyurethane adhesive tape. In other embodiments, the adhesive tape can be replaced with, or used in conjunction with, polyester hot melt, wax, two part epoxy, cyanoacrylate, or other suitable adhesive materials.

FIG. 4 is a bottom perspective view of the force translation segment assembly 109 of FIG. 1 in accordance with one embodiment of the invention.

FIG. 5 is a top perspective view of a base portion 111 of the first twisting tool 100 of FIG. 1 in accordance with one embodiment of the invention.

In the embodiment illustrated in FIGS. 1 to 5, the twisting tool includes 5 set screws. In other embodiments, the twisting tool can include more than or less than 5 set screws. In some embodiments, the set screws are replaced by controlled force applicators such as servo motors or voice coils.

Figure 6:
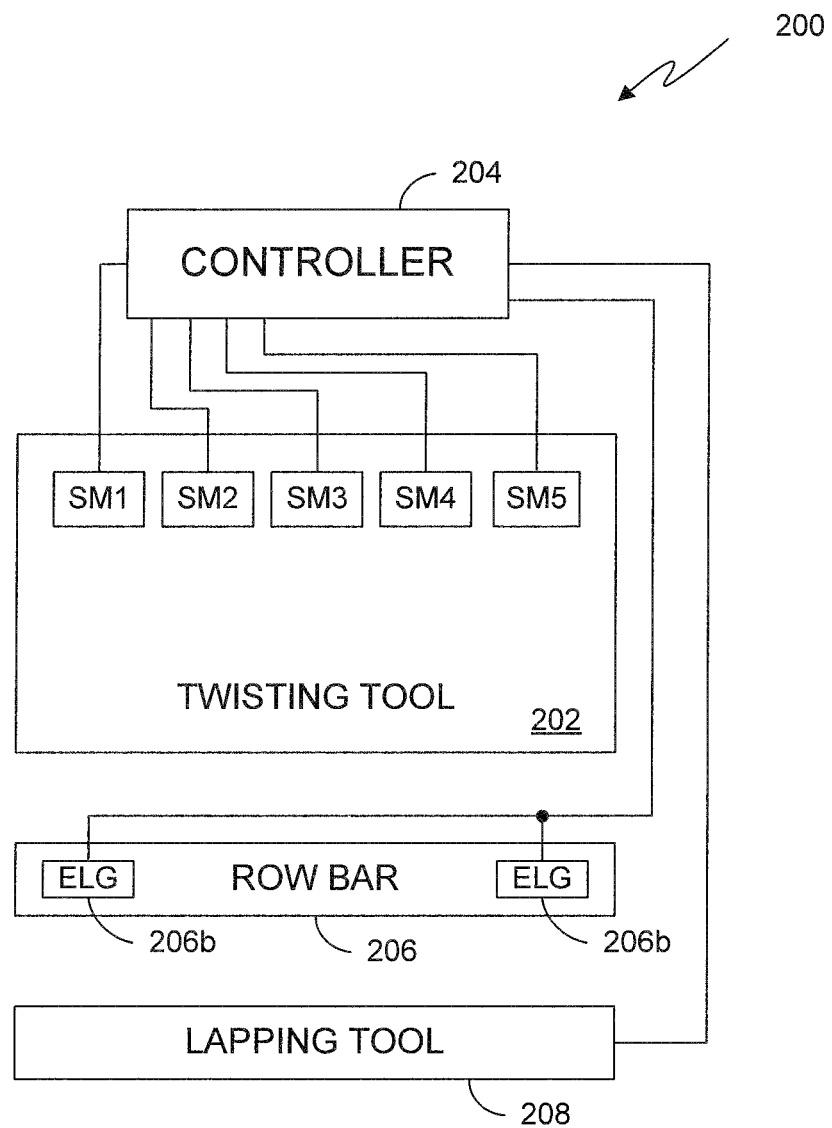
FIG. 6 is a schematic block diagram of a feedback control system for operating a second twisting tool, the feedback control system including a controller, multiple servo motors on the second twisting tool, electronic lapping guides on a row bar, and a lapping tool in accordance with one embodiment of the invention.

FIG. 6 is a schematic block diagram of a feedback control system 200 for operating a second twisting tool 202, the feedback control system 200 including a controller 204, multiple servo motors (SM1-SM5) on the second twisting tool 202, electronic lapping guides (206a, 206b) on a row bar 206, and a lapping tool 208 in accordance with one embodiment of the invention. The controller 204 is coupled to each of the servo motors (SM1-SM5), the ELGs (206a, 206b), and the lapping tool 208. In operation, the ELGs (206a, 206b) can provide a measurement of a dimension of the row bar 206 such as the width of a side of the row bar 206 while another side of the row bar 206 is being lapped by the lapping tool 208.

The controller 204 can activate one or more of the servo motors (SM1-SM5) to apply a twisting force on a portion of the row bar 206. Using the ELG measurements, the controller 204 can determine whether to apply additional twisting force or not. The controller 204 can also determine whether to apply the lapping tool 208 to the row bar 206 or not, and also the speed of the lapping tool 208. As the controller 204 gets feedback on the orientation and dimensions of the row bar 206 based on the ELG measurements, it can quantitatively determine whether it has substantially corrected a sufficient amount of overlay error in the row bar. In several embodiments, the lapping tool 208 also provides feedback information to the controller 204 regarding current operating conditions.

In one embodiment, the controller 204 is implemented as a software program executing on a general purpose or specialized personal computer. In other embodiments, the controller 204 is implemented in a programmable logic device/controller such as a FPGA, PLD, CPLD, or other suitable programmable logic device. In another embodiment, the controller 204 is implemented using one or more processing circuitry components that share information. In some embodiments, the controller includes a proportional integral derivative (PID) controller for using a feedback loop to control devices attached thereto.

Figure 7:
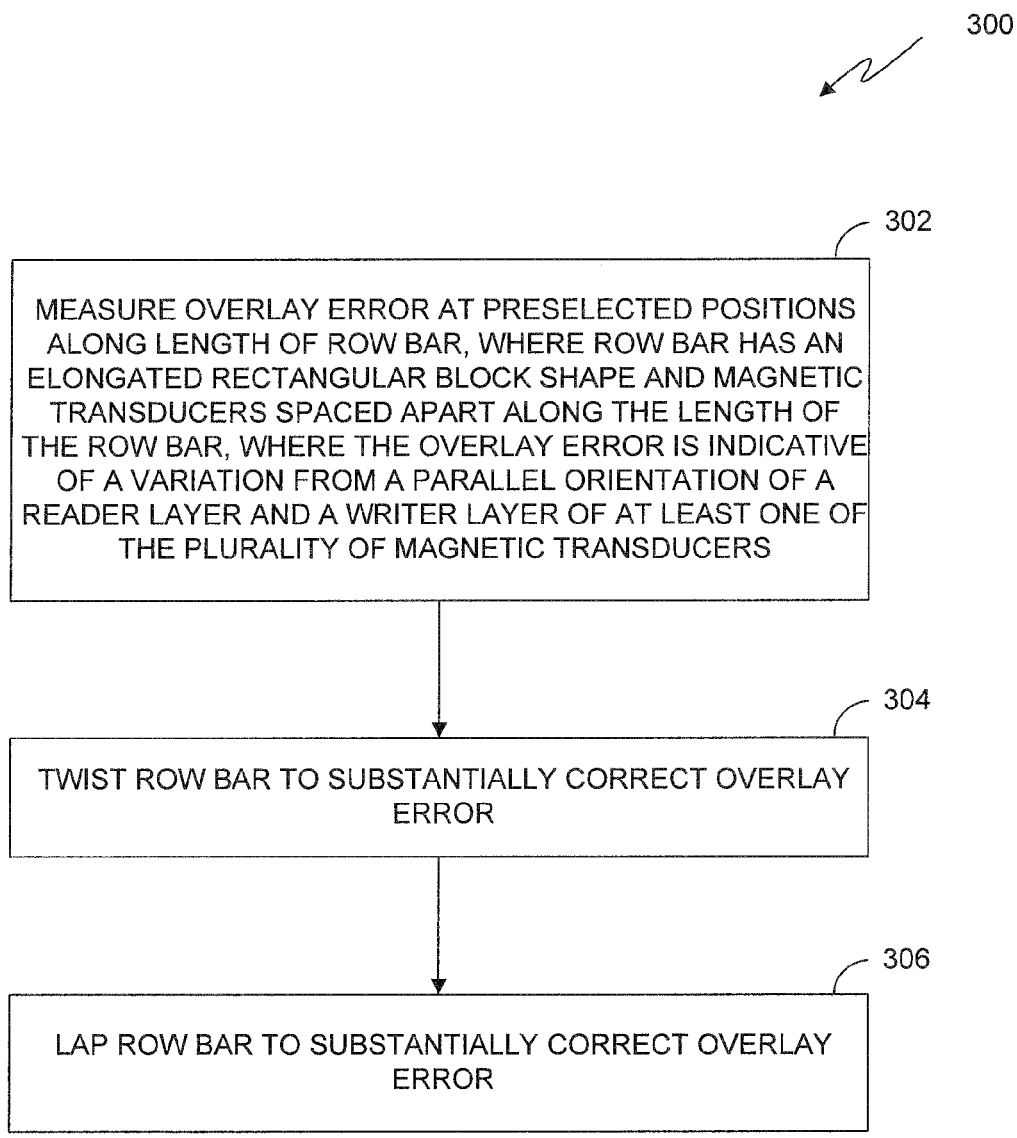
FIG. 7 is a flowchart of a process for correcting for overlay errors in row bars that can be used with a twisting tool in accordance with one embodiment of the invention.

FIG. 7 is a flowchart of a process 300 for correcting for overlay errors in row bars that can be used with a twisting tool in accordance with one embodiment of the invention. In particular embodiments, the process 300 can be used in conjunction with any of the twisting tools illustrated described herein. The process first measures (302) an overlay error at preselected positions along a length of the row bar, where the row bar includes an elongated rectangular block shape and a plurality of magnetic transducers spaced apart along the length of the row bar, where the overlay error is indicative of a variation from a parallel orientation of a reader layer and a writer layer of at least one of the plurality of magnetic transducers. In some embodiments, the process measure the overlay error using manual measurements of the row bar. In other embodiments, the process measure the overlay error using automated measurements of the row bar. The process then twists (304) the row bar to substantially correct the overlay error. The process then laps (306) the row bar to substantially correct the overlay error.

In several embodiments, the row bar is mounted or attached to the twisting tool using an adhesive or other suitable means of attachment. The adhesive can be adhesive tape, polyester hot melt, wax, two part epoxy, cyanoacrylate, or other suitable adhesive materials. In a number of embodiments, the row bar includes one or more electronic lap guides (ELGs). In some embodiments, the process further includes wire bonding to one or more terminals of the ELGs. In a number of embodiments, the ELGs are configured to provide information indicative of a measurement of a dimension of the row bar (e.g., the amount of lapping having been applied in a particular direction, thereby providing a thickness measurement at a particular location or locations along the row bar).

In several embodiments, the process twists the row bar, and/or laps the row bar, by a preselected degree based on the ELG measurement information. In some embodiments, the process twists, and/or laps, the row bar at preselected positions having the overlay error. In several embodiments, the process twists the row bar using a twisting tool configured to twist the row bar at a plurality of areas along the length of the row bar (e.g., a twisting tool having a plurality of planar twisting segments each configured to impart a twisting force on the row bar).

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system for correcting for overlay errors in row bars, the system comprising:
    a twisting tool comprising a force applicator, a first planar twisting segment, and a second planar twisting segment, wherein the first planar twisting segment and the second planar twisting segment are configured to receive and secure a row bar having an elongated rectangular block shape and comprising a plurality of magnetic transducers spaced apart along a length of the row bar,
    wherein the first planar twisting segment is proximal and the second planar twisting segment is distal relative to an end of the row bar;
    wherein the twisting tool is configured to twist the row bar about a longitudinal axis of the row bar at a plurality of areas along the length of the row bar, wherein the force applicator is configured to impart a rotational force on the first planar twisting segment and thereby cause the first planar twisting segment to impart a twisting force on the row bar sufficient to rotate a portion of the row bar about the longitudinal axis, and
    wherein the second planar twisting segment is configured to oppose the twisting force.

2. The system of claim 1, further comprising:
    a lapping tool configured to lap a surface of the row bar, wherein the row bar comprises an overlay error indicative of a variation from a parallel orientation of a reader layer and a writer layer of at least one of the plurality of magnetic transducers, and
    wherein the lapping tool and the twisting tool are configured to substantially correct the overlay error in the row bar.

3. The system of claim 2, further comprising:
    an electronic lap guide (ELG) fabricated within the row bar, the ELG configured to provide information indicative of a measurement of a dimension of the row bar;
    a controller coupled to the ELG, the lapping tool, and the twisting tool, the controller configured to:
        determine the overlay error at a preselected position along the row bar based on the ELG measurement information;
        control a degree of twisting performed by the twisting tool at the preselected position to substantially correct the overlay error at the preselected position; and
        control a degree of lapping performed by the lapping tool to substantially correct the overlay error at the preselected position.

4. The system of claim 1, wherein the plurality of areas comprises a preselected number of areas selected from the group consisting of 3 areas, 5 areas, and 19 areas.

5. The system of claim 1, wherein the twisting tool comprises a plurality of planar twisting segments each configured to impart a twisting force on the row bar.

6. The system of claim 1, wherein the twisting tool comprises a plurality of planar twisting segments in each of the plurality of areas, wherein each of the plurality of planar twisting segments is configured to impart a twisting force on the row bar.

7. The system of claim 6, wherein the force applicator is configured to impart a rotational force on each of the plurality of planar twisting segments in one of the plurality of areas.

8. The system of claim 7, wherein the force applicator comprises an actuator apparatus selected from the group consisting a set screw apparatus, a servo motor apparatus, a voice coil apparatus, a pneumatic apparatus, hydraulic apparatus, a piezoelectric apparatus, and combinations thereof.

* * * * *